United States Patent [19]

Goepfert et al.

[11] 4,454,170
[45] Jun. 12, 1984

[54] METHOD FOR TINTING A SHEET OF POLYURETHANE

[75] Inventors: Serge Goepfert, Samoreau; Serge G. Marsaud, Veneux les Sablons; Serge A. M. Renault, Montigny-sur-Loing; Francoise M. M. Roger, Avon, all of France

[73] Assignee: Corning Glass Works, Corning, N.Y.

[21] Appl. No.: 433,774

[22] Filed: Oct. 12, 1982

[30] Foreign Application Priority Data

Dec. 4, 1981 [FR] France .................... 81 22718
Jun. 17, 1982 [FR] France .................... 82 10582

[51] Int. Cl.³ .................... B05D 7/04; B05D 3/40; G02B 1/10; G02B 5/22
[52] U.S. Cl. .................... 427/160; 8/515; 156/99; 427/163; 427/164
[58] Field of Search .................... 8/515; 427/160, 163, 427/164; 156/99

[56] References Cited

U.S. PATENT DOCUMENTS 3,236,582  2/1966  Ueda et al. .................... 8/515
4,166,889  9/1979  Fujii et al. .................... 8/515 X

*Primary Examiner*—James R. Hoffman
*Attorney, Agent, or Firm*—C. S. Janes, Jr.

[57] ABSTRACT

A method of tinting a sheet of transparent polyurethane comprising a coloring operation followed by a fixation operation.

The aforesaid coloring operation is carried out through immersion of the polyurethane into a bath maintained under continuous agitation and formed of a dispersion of one or several colorants in an aqueous solution containing a surfactant or wetting agent, while the aforesaid fixation operation is carried out through rinsing in a boiling aqueous solution of sodium alkyl sulfonate of the type known under the mark "Teepol".

The application to a double or composite sheet preformed to a thin laminate, that is to say, one layer of a thermoplastic polyurethane and one other layer of a thermosetting polyurethane.

In a particularly useful embodiment of the invention the tinted polyurethane serves as a selective filter having almost zero transmission in the so-called cutoff range of wavelengths lying between about 350–560 nm. Eyeglasses made from such lenses are useful for victims of aphakia and retinitis pigmentosa.

12 Claims, 11 Drawing Figures

METHOD FOR TINTING A SHEET OF POLYURETHANE

BACKGROUND OF THE INVENTION

In the area of safety glass for use in spectacle lenses, lenses for instruments, windows for vehicles, homes, and other applications, laminated structures having one or more layers of optically transparent and flexible plastic materials separating the glass elements have been utilized with the goal of preventing fragmentation and reducing to a minimum the dispersion of splinters when the glass receives an impact of sufficient force to cause breaking. Among the plastic materials applicable for this use, polyurethanes have been proposed as being particularly advantageous.

Thus, British Pat. No. 1,567,394 describes the production of a "double" or preformed two-layer composite sheet with polymers suitable for use in glass-plastic laminates; the double being formed of a layer of a thermoplastic polyurethane exhibiting adhesive characteristics and a second layer of a thermosetting polyurethane. According to this patent, three-ply laminates are prepared consisting of an outside layer of glass to which the aforesaid double or preformed composite sheet is adhesively attached through the medium of the thermoplastic layer.

The British patent notes that the sheet of plastic material can be colored before or after its application against the glass layer, but does not provide any details with regard to the coloring composition or the method for carrying out the coloring.

One method for carrying out the coloring is mentioned in French Pat. No. 2,467,908 where the coloration is obtained through immersion in a bath containing a commercial dye called CIBACRONE, the pH of the bath being less than 4 and preferably on the order of 2.

In addition, the French patent requires that this coloration be carried out at 60° C. or less with colorant concentrations between 0.5-10 grams/liter of bath, preferably 1-3 grams/liter, this coloration treatment capable of being fixed through immersion in a fixing bath, but with no details with regard to conditions. It is clear to the worker of ordinary skill in the art that the use of such a technique poses problems of reproducibility at the industrial level that would be very difficult and burdensome to overcome by technicians and even experts, the maintenance of the level of acidity (pH≦4) being practically impossible to obtain in a continuous manner.

A similar structure of a three-layer laminated lens for use in spectacles is described in French Patent Application No. 81 18678, filed Oct. 5, 1981 under the title "Laminated Ophthalmic Glass and Method of Fabrication" (U.S. Application Ser. No. 349,719, filed Feb. 18, 1982), that lens being formed with an outside layer of glass and an inside layer of a thermosetting polyurethane that is optically transparent and which is attached to the glass element through the medium of a thin layer of optically transparent thermoplastic polyurethane. According to that French patent application, the overall thickness of the double or composite plastic sheet is between 0.25-0.55 mm, with a thermoplastic layer having a thickness of 0.04-0.06 mm and a thermosetting layer having a thickness of 0.2-0.5 mm.

In the field of ophthalmic medicine, it has recently become apparent that physical remedies could be applied to certain diseases of the eye which heretofore were considered very difficult to treat, with retention of the faculty of day vision for the patients. Two common examples of these maladies are the following:

(1) "Aphakia"

This malady results from the absence of the crystalline (lens) of the eye, due most often to surgical intervention. Since one of the functions of the lens is the protection of the retina from ultraviolet rays by optical absorption from a wavelength on the order of 420 to 440 nm, it is obvious that any filter device that can serve in place of the missing lens would be an appreciable advantage to the patient.

(2) "Retinitis pigmentosa"

This malady is the result of the alteration, in a first stage, of the "nocturnal" photoreceivers (generally called rods) of the eye. These photoreceivers, generally situated in the perimeter of the retina, are, owing to their sensitivity curve with the maximum lying at 510 nm, responsible for night vision while having little responsibility for color recognition, merely greys and shadows (see, in this connection, the description given in reference to FIG. 1 of the European patent application published Dec. 16, 1981 under No. 41,789).

The "diurnal" photoreceivers of the eye (generally called cones) occupy the center of the retina and have maximum sensitivity around 560-565 nm (see this same FIGURE); they are responsible for day vision and color recognition.

Alteration of these photoreceivers (rods and cones) can be due to the widest variety of causes, such as contusion or mechanical injuries, prolonged accidental irradiation (electric arc, sunlight, etc.), but also bacterial (rarely viral) infection and above all, retinal degeneration.

It is generally admitted that retinal degeneration and bacterial infections of the cones and rods can be considerably inhibited by protecting them from harmful rays. It is, moreover, also acknowledged that the alteration of the rods is much faster than that of the cones. It will thus be easy to understand the great interest there would be in a filter protecting the rods of the eye from harmful rays. But in the matter of their protection, the selection of a filter of ultraviolet radiation should be accompanied by a certain number of precautions such as:

(a) possibility of filtering the light both in the presence and the absence of sunlight; and (b) possibility of safeguarding the sensitivity of the cones, enabling the patient to retain color recognition and distinction.

Photochromic filter lenses have been proposed by M. L. Wolbarsht and others in "RETINITIS PIGMENTOSA, CLINICAL IMPLICATIONS OF CURRENT RESEARCH", *Advances in Experimental Medicine and Biology*, 77, pages 181 to 190, Plenum Publishing Corp., New York. To these proposals should be added the said European patent application bearing on a photochromic filter product responding to the medical needs set forth here, but whose application is possible only with certain vitreous compositions. That European patent application requires a surface reducing treatment of certain metallic oxides contained in the basic glass, which treatment results in lenses that have retained their photochromic properties while also exhibiting the requisite filtering properties. Unfortunately, this treatment is applicable only to a limited number of vitreous compositions, viz., those containing easily reducible metal oxides.

The present invention is directed to the coloring of the polyurethane double or composite plastic sheet either before (that is to say in its current state), or after lamination (that is to say after attachment with the glass layer), the second practice being preferred because it is more profitable in the commercial production of the final product. The inventive method is especially useful in ophthalmic applications. Thus, in preparing corrective lenses for eyeglasses, it is common practice to use glasses exhibiting special properties as to refractive index and dispersion; even combinations of several glasses of different refractive indices sealed to one another in a single lens, commonly termed a multi-focal lens. The instant invention provides a method for preparing eyeglass lenses demonstrating filtering properties appropriate to the desires of the ophthalmologist and adjustable according to the degree of evolution of the retinal alteration of the patient due to aphakia or retinitis pigmentosa.

The present invention is more particularly concerned with a method for coloring polyurethane followed by a fixation operation. According to the present invention, the coloring operation is carried out with the aid of a dispersion of colorants in an aqueous solution containing a wetting agent or surfactant. The solution is subjected to constant agitation to improve the dispersion of colorant and to maintain the level of color and homogeneity of the tinted surface. As for the subsequent fixation operation, it is carried out through a thermal treatment and rinsing which requires an open structure in the polyurethane sheet in order to fix the colorant therewithin.

In practice, the simplest method for fixing consists of rinsing in a boiling aqueous solution of sodium alkyl sulfonate a kind known under the designation of "Teepol", for example, at a concentration of 30 cc/liter at 99° C. for less than 10 minutes.

Satisfactory results have been obtained with a product termed "plastosoluble" formed of dispersed colorants having a low solubility in water and which is called thus because, concentrated and prepared in the dispersed state for synthetic fibers of the textile industry, it diffuses and appears to dissolve therein, giving rise to the graphic expression "plastosoluble". For effective application from aqueous liquids, it is convenient to incorporate soluble dispersing agents in the water such as surfactants.

In fact, it is necessary to "microdisperse" the colorant to obtain a stable colloidal solution in the bath of dye and to maintain this microdispersion throughout the whole operation, which factor underscores the importance of the added surfactant to inhibit eventual agglomeration in the course of the operation.

The colorants utilized are of the type currently named A.C.R. in commerce and could be supplied by the New Chemical Technical Society (T.C.N.), 8 Allee Marie-Louise, 92240 Malakoff, France. They are employed for the coloration of other organic materials such as, for example, an alkyl carbonate of diethylene glycol, known under the commercial designation "CR 39". It is worth noting that, if the colorants utilized in the practice of the present invention are of the type as those employed for "CR 39", they do not give rise to the same tints in the two cases; the reason for this situation being the chemical acceptability of polyurethane colored according to the process of the present invention.

Furthermore, the choice of coloring materials utilized to obtain the stated proper tint and of the surfactant is made from products of commerce on the basis of profit making capability and not as a limitation of the present invention.

The invention will be better explained from the practical examples which follow and are illustrated by the appended drawings wherein.

In FIGS. 2A–8, % transmission is recorded along the ordinate of the graph and wavelength in nm is reported along the abscissa.

For the making of the diagrams set forth in FIGS. 2A–4B, optical transmissions obtained on ophthalmic or solar lenses of the type described in the above-mentioned French Patent Application No. 81 18678 were measured on finished products of 2 mm thickness using a Cary 14 spectrophotometer. These optical transmissions, named in order A-AB-B1-B2-C.D., comply with the conventions generally used in the profession. The curves included in FIGS. 5–8 were derived utilizing a Hewlett-Packard Type 8450A computerized spectrophotometer.

Figure 1:
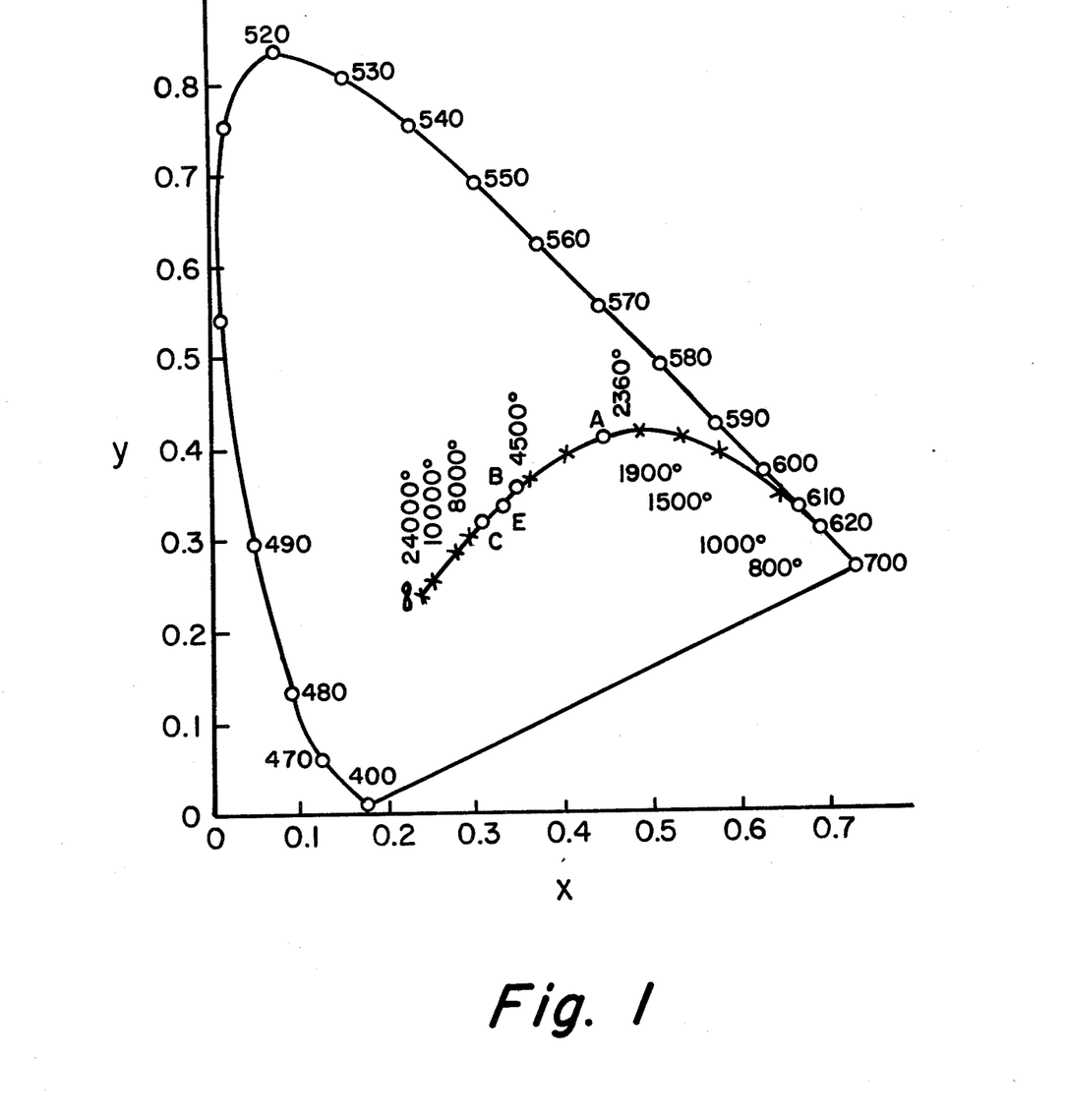
FIG. 1 is a diagram of chromaticities of different important illuminants of the British Society I.C.I.
Figure 2A:
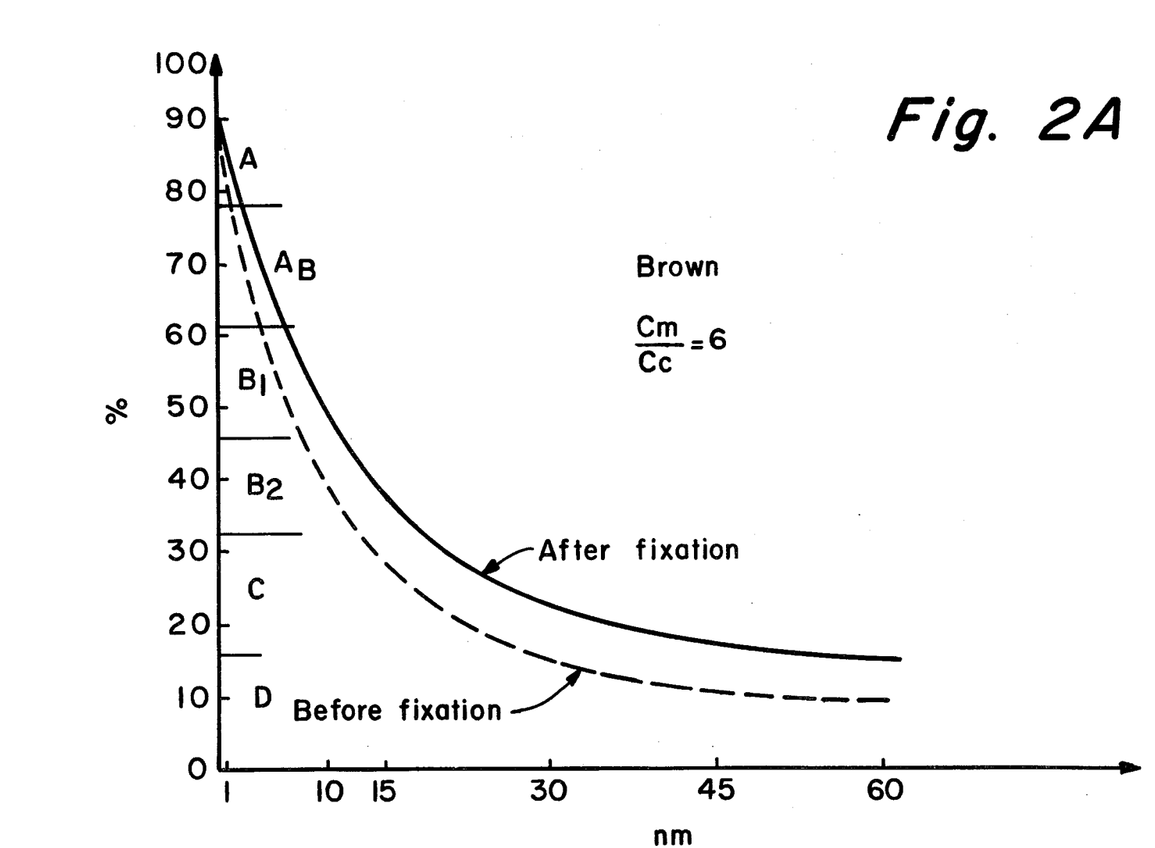
FIGS. 2A and 2B depict the characteristic curves relative to obtaining a brown tint according to the method of the invention.
Figure 2B:
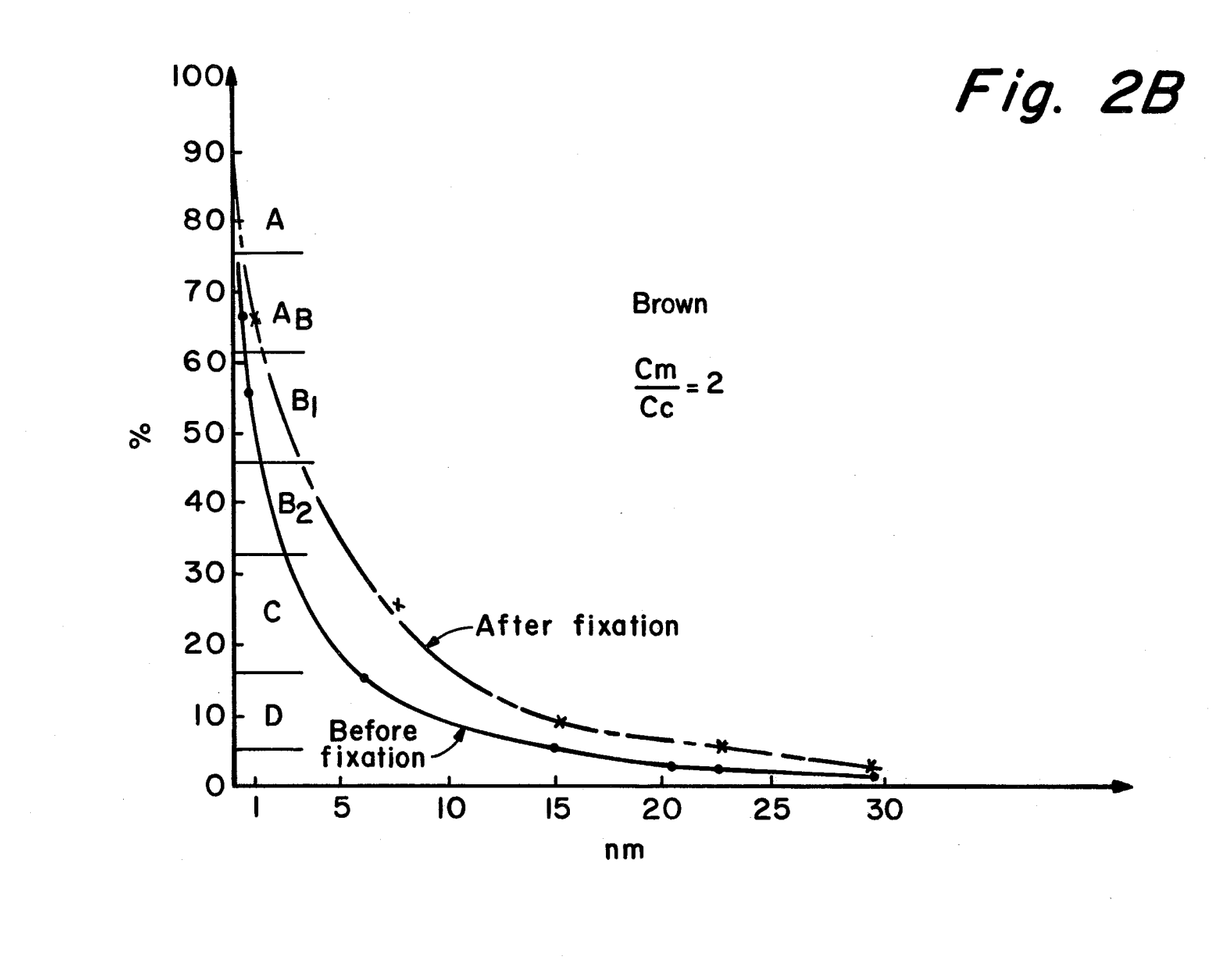
Figure 3A:
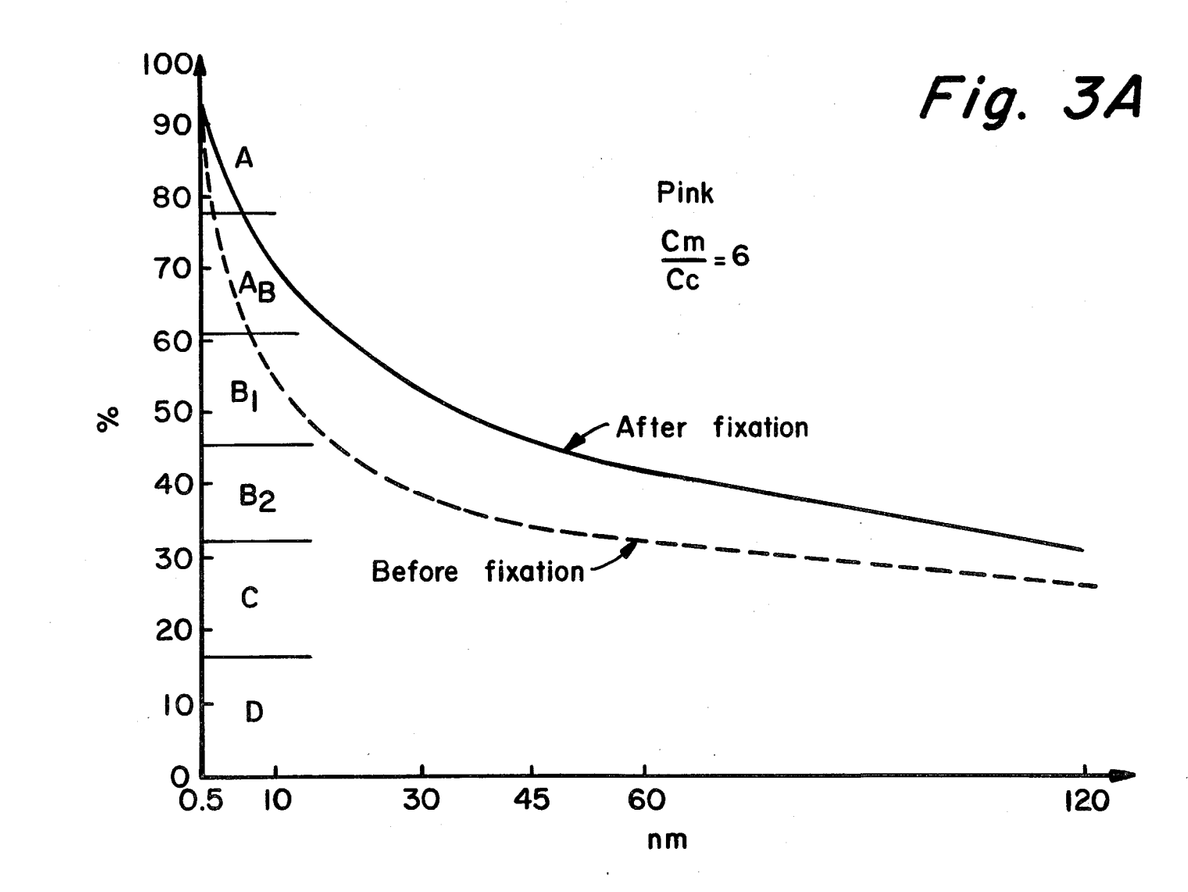
FIGS. 3A and 3B are analogous graphs relative to obtaining a pink tint.
Figure 3B:
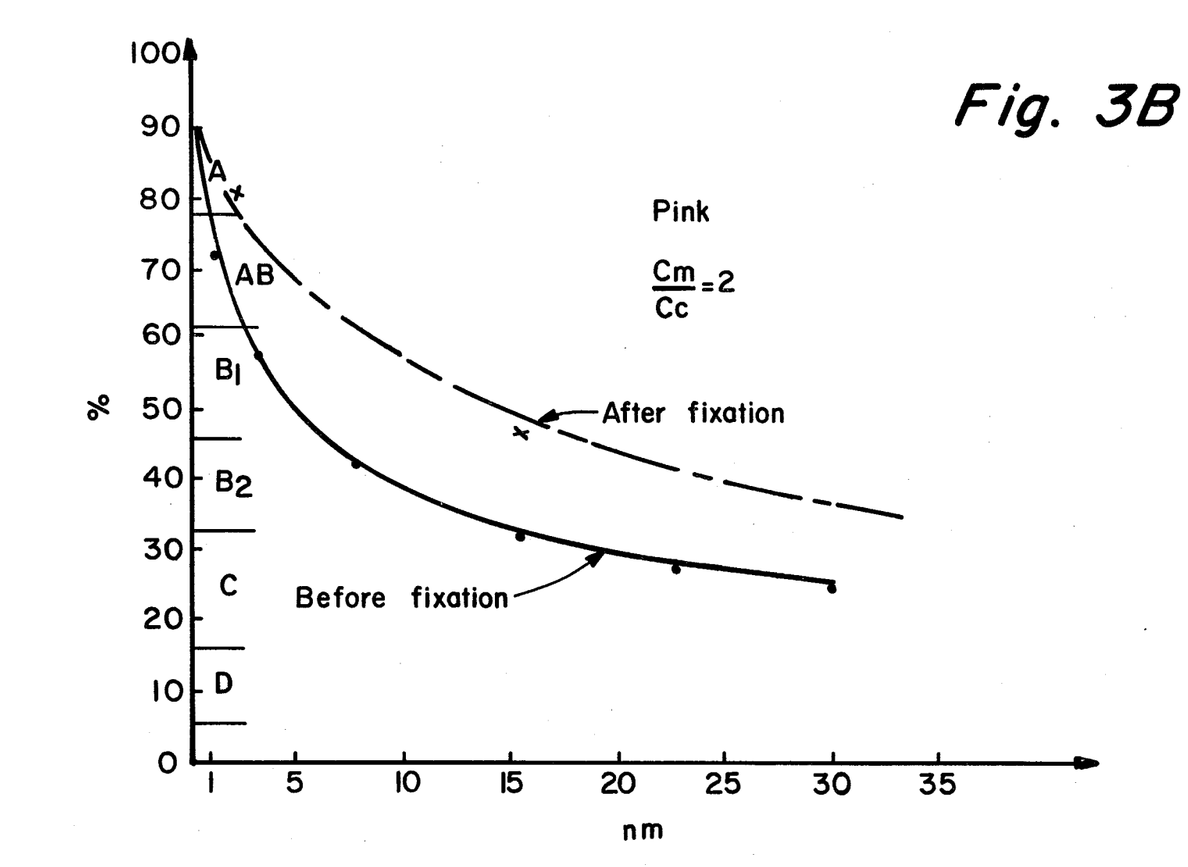
Figure 4A:
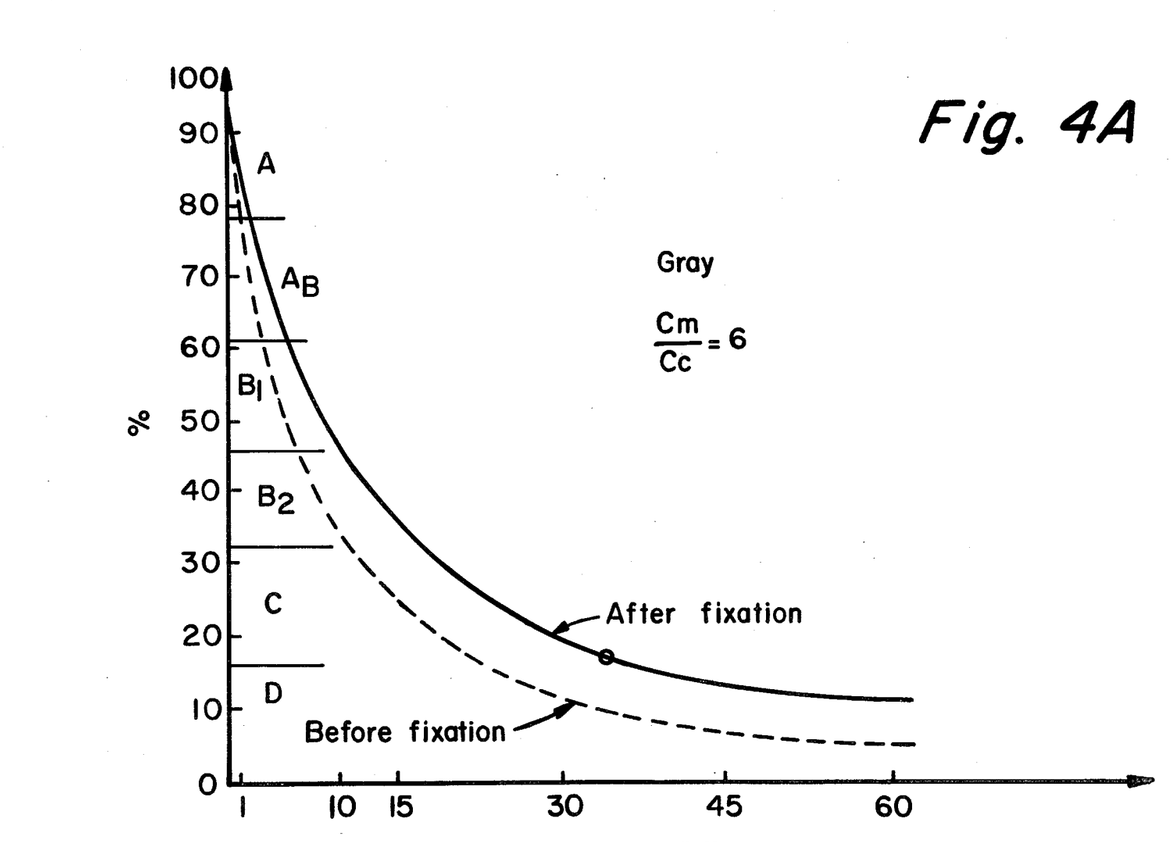
FIGS. 4A and 4B are also analogous graphs relative to obtaining a gray color.
Figure 4B:
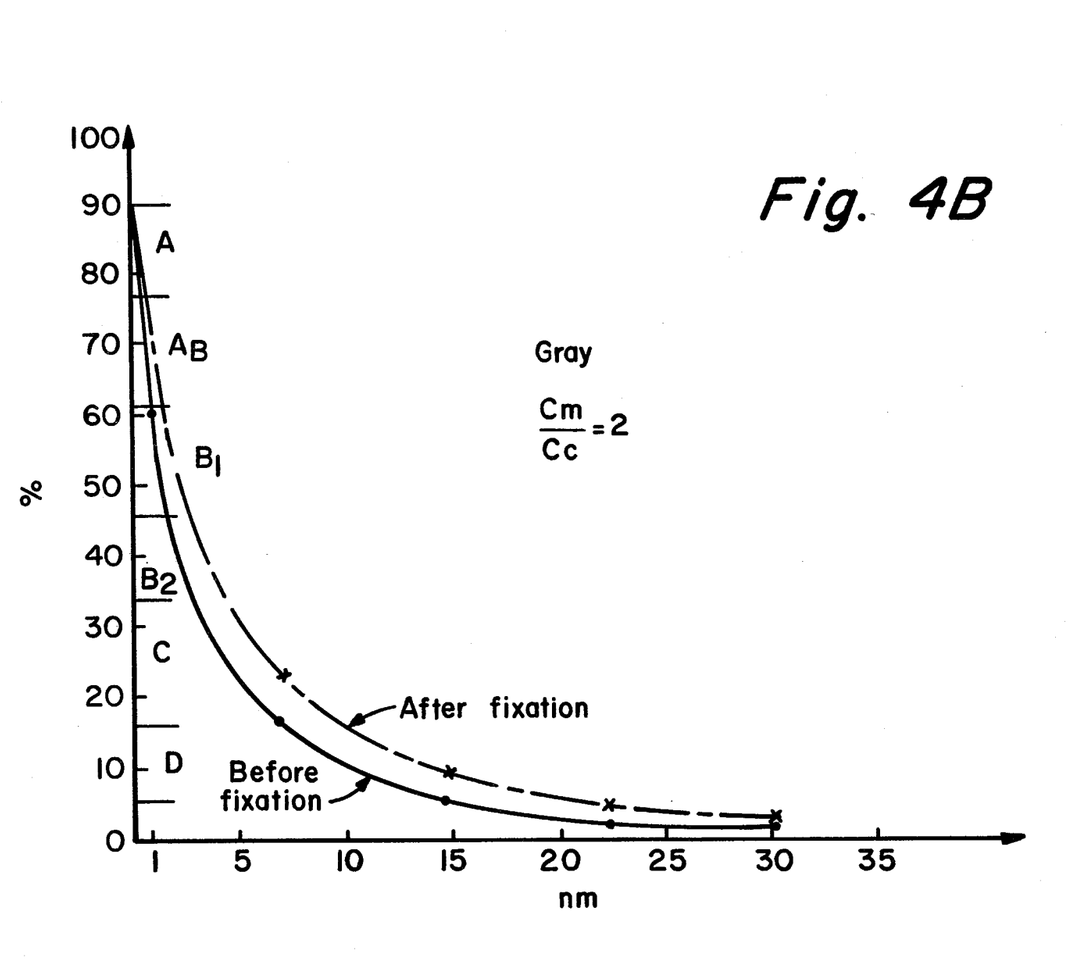

In the diagram of FIG. 1, the continuous arrow represents the site of radiation originating from a black body at different temperatures. Points A, B, and C represent the chromaticity of the illuminants of the I.C.I. Society. Point E represents the chromaticity of a source of radiation of equal quantities of energy in each interval of wave length.

In what follows, the tints chosen and classified by their trichromatic coordinates were measured from the chromaticity of Illuminant C, as defined by FIG. 1 and generally accepted in the spectacle art. These tints are the most current and the best known but are in no way the only ones which can be used in the method of the present invention; moreover, the invention is not limited to medical and/or ophthalmic and solar lenses but can be extended to have application in all other areas of industry or art calling for the making of a polyurethane product.

The basis for obtaining the desired tints is assured through mixing one or several primary colorants of the type:

Red: 3443 ACR
Blue: 3438 ACR
Yellow: 3441 ACR
Orange: 3439 ACR
Pink: 3442 ACR associated in suitable proportion with one or several tension active agents—generally called "wetting agents"—of the fatty alcohol type of commercial reference 3782-4005.

One carries out these operations according to the process which will now be described in the following examples wherein Example 1 serves as the pilot and the following constitute extensions, these examples being illustrated through the graphs wherein the soaking temperatures in minutes are reported on the abscissa and the optical transmission in percent on the ordinate. Each example was treated with a ratio of Cm:Cc of 6 for one part (FIGS. 2A, 3A, and 4A) and a ratio of 2 on the other part (FIGS. 2B, 3B, and 4B), where Cm is the concentration of the wetting agent and Cc is that of the colorant mixtures.

EXAMPLE 1

Obtaining A Brown Tint

In this example one makes a colorant mixture according to traditional techniques of mixtures of primary colorants in the following proportions by weight:
 Red 3443 ACR 40%
 Blue 3438 ACR 20%
 Yellow 3441 ACR 40%

The tinting bath is then made by diluting the colorant mixture in distilled water having an electrical resistivity of $10$–$17\mu\Omega$–cm, said water being maintained at 60°–70° C. by heating in a water bath, in combination with a wetting agent of the type 3782 ACR in the following proportions of colorant concentration Cc and wetting agent Cm:
 Cc=2 g/l
 Cm=12 g/l
either in the ratio of Cm:Cc=6 or, for more pronounced tints:
 Cc=6 g/l
 Cm=12.
with a ratio of Cm:Cc=2.

The tinting bath assembly thus obtained is then brought to 80° C.±1° C. and subjected to a continuous agitation to eliminate the risk of preferential segregation of one or more of the base colorants.

After thermally stabilizing the tinting bath, the coloring operation is then possible; this operation being effectuated through immersion of lenses coated with polyurethane and/or pieces of polyurethane in the bath for times varying from 5 seconds to 1 hour, this time being a function of the level of transmission desired.

At the conclusion of this coloring operation, the inventive method proceeds to the stage of fixation-rinsing through immersion of the colored pieces into a boiling solution of "Teepol" for 10 minutes (as previously described).

This important operation will confer to the final material thus obtained a resistance to light and to conditions of humidity and temperature much enhanced in relation to organic products similarly colored through immersion in a dye but not fixed. The fixing operation is accompanied with an increase in transmission of about 10%, as indicated on the curves of FIGS. 2A and 2B.

EXAMPLE 2

Obtaining A Pink Tint

The preparation of the base colorant is obtained by combining the primary colorants in the following proportions by weight:
 Pink ACR 3442 94%
 Blue ACR 3438 2%
 Yellow ACR 3441 4%

The tinting bath is obtained according to the same process as Example 1, always with the addition of a wetting agent. The tinting treatment is carried out in the same temperature region. The results obtained after immersion at different times are consonant with the curves in FIGS. 3A and 3B.

EXAMPLE 3

Obtaining A Gray Tint

The preparation of the base colorant is obtained by combining the primary colorants in the following proportions by weight:
 Red 3443 ACR 32%
 Blue 3438 ACR 40%
 Yellow 3441 ACR 28%

The tinting bath is obtained according to the process explained in Example 1 with the adding of a wetting agent. The tinting treatment is carried out in the same temperature region with the results consonant with those of the curves of FIGS. 4A and 4B.

It is very evident that other tints can be obtained (green, yellow, red ...) according to the same process.

Higher treatment temperatures were used without, however, exceeding 90° C., the temperature at which the majority of the primary blue colorants crystallize and are harmful to the homogeneity of the tint obtained. These treatments at higher temperature are particularly interesting for obtaining deeper colors with low transmissions (<10%) but are not safe for tints at high transmission; a compromise will accordingly be employed depending upon the object of the research goal.

Sometimes after the fixation-rinsing operation a slight hazy tint appears which gives a milky aspect to the tint obtained. This aspect disappears spontaneously after 48 hours at ambient temperature or more rapidly after 1 hour of heating a colored lens at 60° C.

For very deep tints it is also recommended that the rinsing operation be preceded by a thermal treatment in a heating cabinet for one hour at 125° C., this operation having the goal of increasing the bonding of the colorants to the polyurethane and only applies to those products much exposed to extreme climatic conditions (continuous high humidity and temperature) making them capable of relating to a treatment called tropicalization.

Particularly satisfying results were obtained by having recourse to polyurethanes responding to the chemical compositions specified in French Patent application No. 79 29968, deposited Dec. 6, 1979 and published under No. 2,470,682.

Furthermore, whereas reference has been made above most especially to doubles or two-layer composites of polyurethane destined for making optical lenses, this application is by no means so limited. In fact, the coloring process of the present invention is suited just as much to windows adapted to other areas of application, for example, automobile or building, as was indicated at the very beginning of this patent application.

These windows can, furthermore, be constituted of single sheets of inorganic or organic glass (methacrylate or polycarbonate, for example) or of laminates constituted through assembling at least two sheets of these glasses.

Sheets of organic and inorganic glass can also be assembled in the body of the same laminate, as is currently practiced in these types of windows.

However, not only is the instant invention useful in providing colored composite products, but it expressly envisages the application of the method for tinting polyurethane with special colorants to the medical field for obtaining filters which respond fully to criteria and specifications developed quite recently. The following working examples will promote a better understanding of the methodology of this embodiment of the present invention.

EXAMPLE 4

Obtaining Filter Lenses in the 550 nm Range for Retinitis Pigmentosa

A colorant mixture is produced in accordance with traditional techniques for preparing mixtures of primary colorants having the following proportions by weight:
Red 3443 :ACR 70%
Blue 3438 :ACR 4%
Yellow 3441 :ACR 26%

A tinting bath was formed in accordance with the description above for Example 1 to yield the following proportions of concentration of colorant Cc and wetting agent Cm:
Cc=2 g/l
Cm=4 g/l
or a ratio Cm:Cc=2

The entire dye bath thereby obtained was then brought to 80°±1° C. and subjected to continuous agitation to eliminate the risk of preferential segregation of one or more of the primary colorants.

After the dye bath has been thermally stabilized, the tinting process is carried out by immersing lenses coated with polyurethane or pieces of polyurethane, as the case may be, for a soaking time of 20 minutes ±1 minute. Upon completing the coloring immersion, the colorants were fixed in the polyurethane structure by heat treating the pieces for one hour at 125°±5° C., followed by rinsing for 10 minutes in a boiling aqueous solution of sodium alkyl sulfonate at a concentration of 30 cc/liter of water.

In the present case the glass forming the basic support lamina was a photochromic glass marketed by Corning Glass Works, Corning, N.Y. under the trademark PHOTOGRAY EXTRA (Catalog Code 8111). That glass was also utilized in the above European Patent Application No. 41,789 for a similar purpose, but with the use of a surface reducing treatment.

Figure 5:
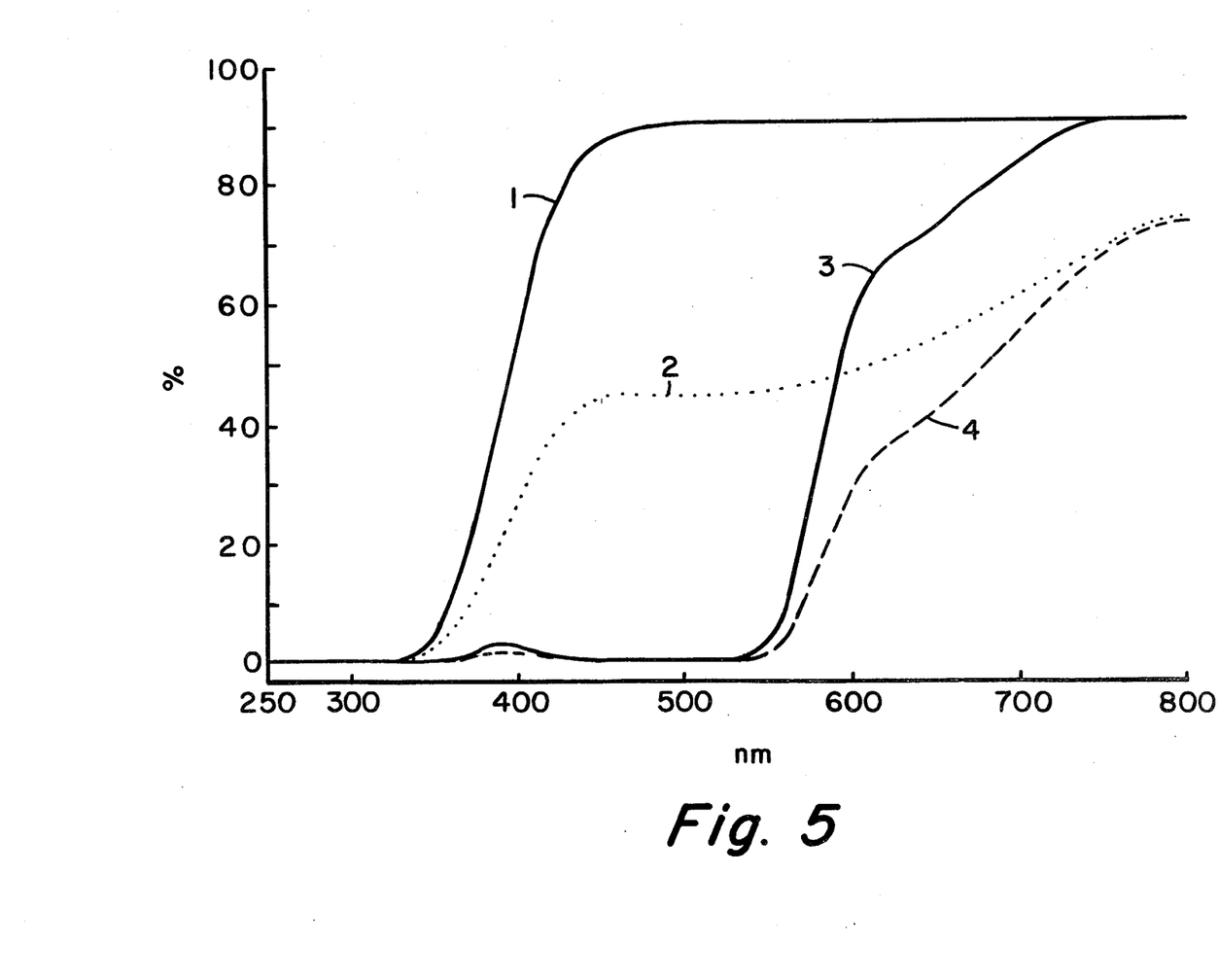
FIGS. 5–8 depict optical transmissions as a function of wavelength of products produced according to the method of the present invention.
Figure 6:
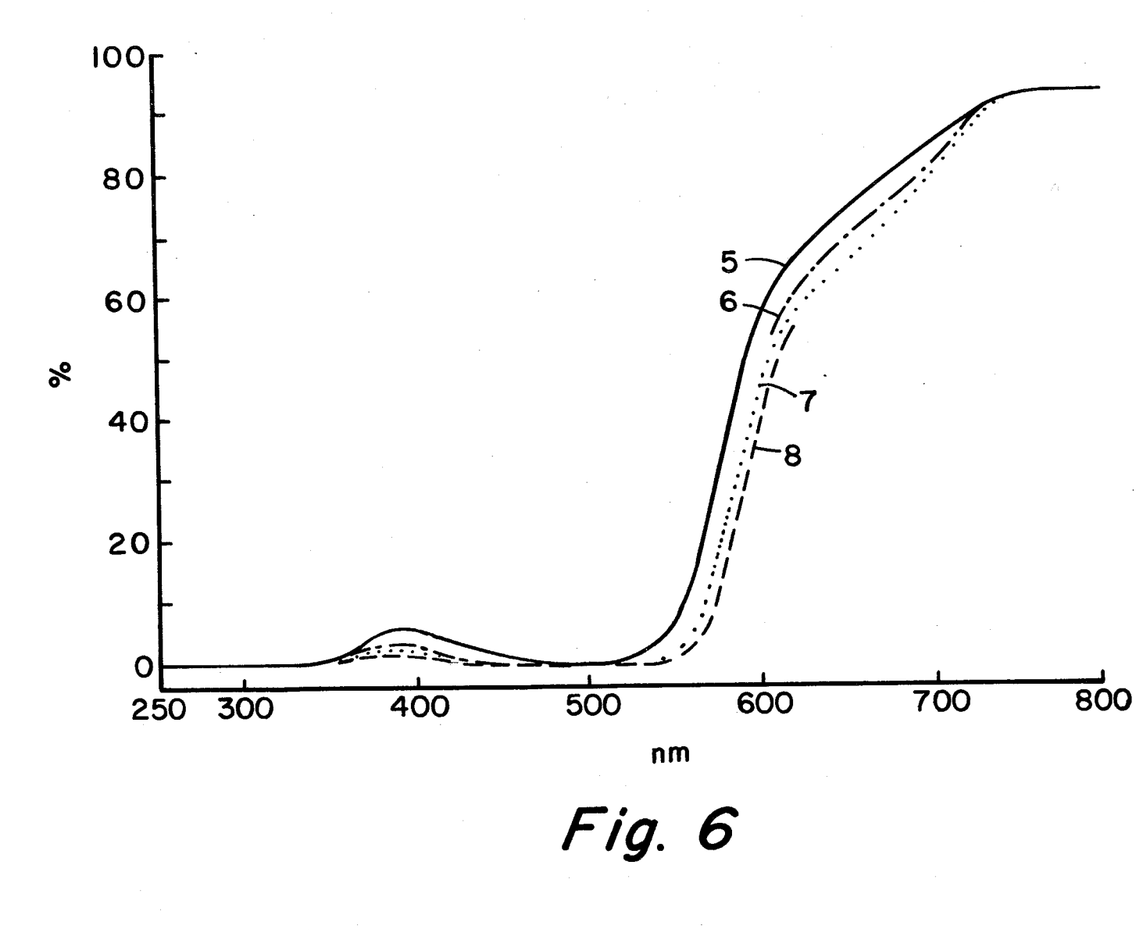

This glass, having a thickness of 1.8 mm and combined with a composite sheet of untinted polyurethane having a thickness of 0.45 mm, constitutes a virgin lens whose optical transmission as a function of the wavelength in nm at an ambient temperature of 22° C. is illustrated by Curves Nos. 1 and 2 of FIG. 5, corresponding to the clear state and the darkened state, respectively. Also depicted in FIG. 5 are Curves Nos. 4 and 5 delineating the optical transmission of the same lens, but after being tinted under the same conditions of temperature (22° C.) and state (clear and darkened), the polyurethane having undergone the coloring and fixing treatments of the instant invention. That set of measurements and the calculations of typical characteristics of this type of product were determined with the aid of a Hewlett-Packard Type 8450A computerized spectrophotometer.

As indicated in "Photic Damage in Retinitis Pigmentosa and a Suggestion for a Protective Device" by W. Adrian and I. Schmidt in the *Journal of the American Optometric Association*, 46, pages 380–386, April 1975, and "Protective Spectacles for Retinitis Pigmentosa Patients" by R. Ewerson and I. Schmidt in the same journal, volume 47, pages 738–744, June 1976, concerning glass types with a cutoff at 550 nm (as in the case of the present example), it is important to reduce somewhat the optical transmission at the level of sensitivity of the cones, called "photopic transmittance" in the publications cited, and to reduce as much as possible the optical transmission at the level of sensitivity of the rods, called "scotopic transmittance" in the publications cited, in order to obtain the relief desired while retaining the color distinction in persons suffering from retinitis pigmentosa.

The following values are generally acknowledged as comprising a perfect filter:
Scotopic transmittance less than 3%
Photopic transmittance more than 17%.

For the present example, on the basis of optical measurements made as indicated in FIG. 5, the chromaticity of Illuminant C of the I.C.I. Company was used for the calculation in percentage of the photopic and scotopic transmittances, and the results were obtained on 8 experiments, see Table I below:

TABLE I

| Experiment No. | Scotopic % | Photopic % | Wavelength Cutoff (nm) |
|---|---|---|---|
| 1 | 1.80 | 19.11 | 553.8 |
| 2 | 1.89 | 19.53 | 553 |
| 3 | 2.15 | 20.75 | 553.6 |
| 4 | 1.81 | 19.29 | 553 |
| 5 | 2.16 | 20.96 | 554.2 |
| 6 | 1.97 | 20.12 | 554.2 |
| 7 | 1.96 | 20.19 | 554.2 |
| 8 | 2.20 | 21.30 | 553.1 |

The results reveal the stability of the method in which the dye bath was enriched in the proportion of 0.5 g/l of mixture (colorant+wetting agent) according to the original compositions in all even-numbered experiments. These results establish the facility with which the product obtained responds to the physical characteristics desired by the user.

EXAMPLE 6

Influence of Soaking Time in Obtaining 550 nm Filter Lenses

In order to analyze the flexibility of the dyeing process of the present invention, a determination was made of the repercussions that the soaking time in the colorant bath might have on the physical characteristics of the filter obtained; soaking times of between 15 minutes and 1 hour were studied. In the dye bath prepared as in Example 5, making use of the technique of coloration and fixing of the colorants indicated in that Example, the study of the influence of the soaking times is in accordance with the results indicated in FIG. 6. It appears that the absolute value of the cutoff can be adjusted as desired, owing to the flexibility permitted by the present invention.

In regard to the influence of the soaking times on the photopic and scotopic transmissions, reference is made to Table II in which, for each soaking time, the corresponding values of the various physical characteristics are given:

TABLE II

| Soaking Time in Minutes | Scotopic % | Photopic % | Wavelength Cutoff in nm |
|---|---|---|---|
| 15 min. Curve No. 5 | 2.99 | 22.55 | 547.9 |
| 20 min. Curve No. 6 | 1.89 | 19.33 | 553 |
| 30 min. | 1.35 | 16.14 | 558 |

TABLE II-continued

| Soaking Time in Minutes | Scotopic % | Photopic % | Wavelength Cutoff in nm |
|---|---|---|---|
| Curve No. 7 1 hr. | 0.93 | 13.86 | 562.7 |
| Curve No. 8 | | | |

EXAMPLE 7

Obtaining a Filter for Aphakia

The obtaining of filters after surgical removal of the lens, commonly known as aphakics, passes through the embodiment of spectacle lenses (corrective or not) having cutoff wavelengths generally falling between 420 and 550 nm, and more precisely, three characteristic cutoff wavelengths which are: 516, 523, and 531 nm.

In the example, two colorant mixtures were made according to the process set forth in Example 5, but with different concentrations and natures of the primary colorants. The proportions by weight of these mixtures were as follows:

| Mixture A | Mixture |
|---|---|
| Orange 3439 ACR: 98% | Red 3443 ACR: 42% |
| Blue 3438 ACR: 2% | Blue 3438 ACR: 4% |
| | Yellow 3441 ACR: 54% | the $C_m/C_c$ concentrations of colorant and wetting agent always being in the ratio of 2, that is to say:

$C_c = 2$ g/l of water
$C_m = 4$ g/l of water

After dyeing with different times of soaking and fixing of colorants in the polyurethane structure for each of the mixtures selected in the present example, measurements of transmission were made and the cutoffs obtained were determined.

Figure 7:
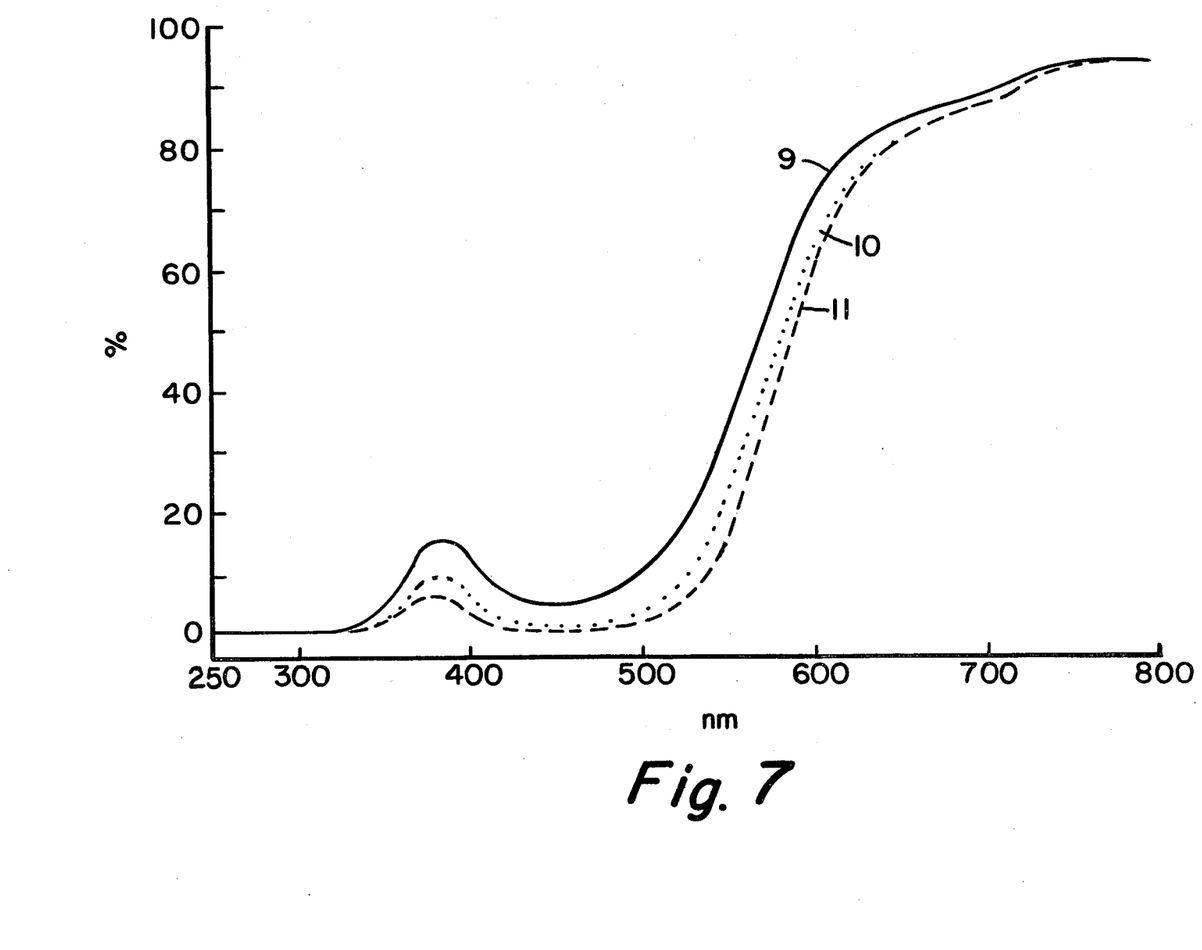
Figure 8:
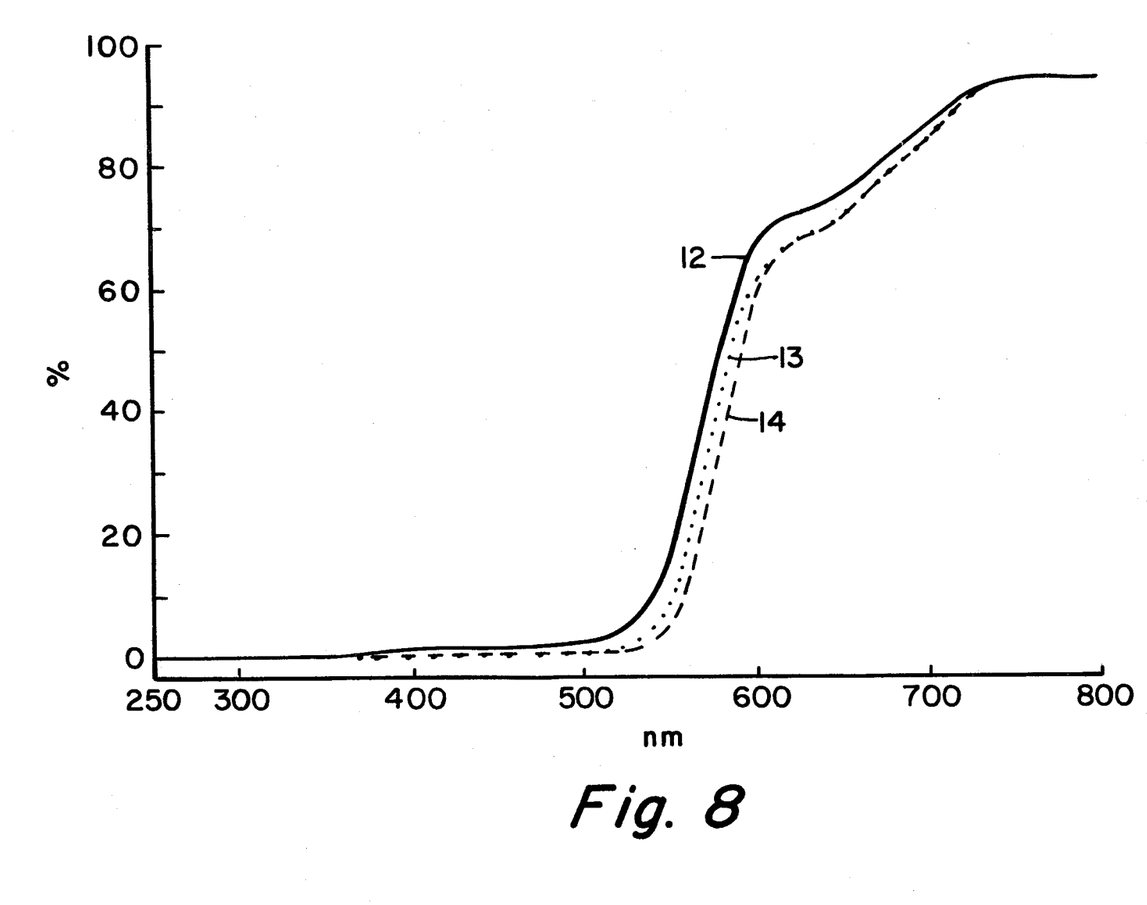

FIGS. 7 and 8 show the results reached in regard to the cutoff values obtained as a function of the mixtures chosen and of the soaking times used. Table III gives the cutoffs thus obtained in the range under consideration:

TABLE III

| Soaking Time | Mixture A (FIG. 7) Cutoff (in nm) | Mixture B (FIG. 8) Cutoff (in nm) |
|---|---|---|
| 15 min. Curve No. 9 | 491 | — |
| 30 min. Curve No. 10 | 514 | — |
| 1 hr. Curve No. 11 | 524 | — |
| 15 min. Curve No. 12 | — | 532 |
| 30 min. Curve No. 13 | — | 543 |
| 1 hr. Curve No. 14 | — | 550 |

Table III clearly reveals the possibilities offered by the present invention for obtaining selective filters applicable to medical spectacle-making. Moreover, it is possible to note the flexibility of the process of the present invention, which is in no way limited to one type of support, but can be associated with any kind of glass used in ophthalmic solar spectacle making such as:

(a) inorganic glasses, photochromic or not, whatever their index and dispersion; and (b) organic glasses, whatever their chemical composition.

For all of these materials, the method of the invention imposes no restriction in regard to forms, levels of curvature, and complexity of surfaces involved.

It goes without saying that the above-described means of execution are only examples that can be modified, in particular by substitution of technical equivalents, without departing from the scope of the invention.

In particular, it is quite possible to extend the range of absorption of ultraviolet radiation into the domain of wavelengths between 350 and 400 nm without the development of coloration, as is commonly found in other similar cases of absorption in this range of wavelengths.

For this, an absorbent of the UV 4249 type available on the market is mixed with distilled water in the proportion of 1 gram per liter of water, then brought to 80° C.±1° C. At this temperature, the glasses are immersed in the tinting bath for times ranging between 7 and 60 minutes, and more preferably between 7 and 30 minutes, as a function of the cutoff desired.

Following this operation, a fixing stage is then undertaken by immersion in a bath having the composition of the one specified above (10 minutes at the boiling point in 30 cc/liter of Teepol).

The term "cutoff" used above is generally understood to mean the intersection of the tangent to the curve of transmission with a parallel to the abscissa issuing from the 0% transmission point on the ordinate, but it is obvious that any other method of evaluation of this "cutoff" could be adopted without departing from the scope of the present invention.

We claim:

1. A method of tinting a sheet of transparent polyurethane comprising a coloring operation followed by a fixation operation characterized in that the aforesaid coloring operation is carried out through immersion of the polyurethane into a bath held between about 80°–90° C. maintained under continuous agitation and formed of a dispersion of one or more colorants in an aqueous solution containing a surfactant or wetting agent, while the aforesaid fixation operation is carried out through rinsing in a boiling aqueous solution of sodium alkyl sulfonate.

2. A method of tinting according to claim 1 characterized in that it is carried out on a sheet of transparent polyurethane previously sealed onto a transparent glass support.

3. A method of tinting according to claim 1 characterized in that the surfactant is of a fatty alcohol type.

4. A method of tinting according to claim 1 characterized in that the concentration of colorant in water is of the order of 2 grams/liter or 6 grams/liter.

5. A method of tinting according to claim 1 characterized in that the concentration of wetting agent in water is of the order of 12 grams/liter.

6. The application of the method of tinting according to claim 1 to a double or composite sheet preformed to a thin laminate, that is to say, one layer of a thermoplastic polyurethane and one other layer of a thermosetting polyurethane.

7. The application of the method of tinting according to claim 6 characterized in that the double is sealed onto a transparent glass support.

8. The application of the method of tinting according to claim 7 wherein said glass exhibits photochromic behavior.

9. The application of the method of tinting according to claim 8 wherein said tinting provides a selective filter having almost zero transmission in the range of wavelengths lying between about 350–560 nm.

10. The application of the method of tinting according to claim 9 wherein said filter exhibits a selective cutoff at about 550 nm such as to render it appropriate for victims of retinitis pigmentosa.

11. The application of the method of tinting according to claim 9 wherein said filter exhibits a selective cutoff at wavelengths of 516, 523, and 531 nm, thereby rendering it appropriate for victims of aphakia.

12. The application of the method of tinting according to claim 9 wherein said filter lies in the range of 250–400 nm without giving rise to any observable coloration.

* * * * *